United States Patent
Grasmann

[11] Patent Number: 6,040,761
[45] Date of Patent: Mar. 21, 2000

[54] ACOUSTIC WARNING SYSTEM FOR MOTOR-VEHICLE SUBSYSTEM

[75] Inventor: Ulrich Grasmann, Düsseldorf, Germany

[73] Assignee: Kiekert AG, Heiligenhaus, Germany

[21] Appl. No.: 09/103,312

[22] Filed: Jun. 24, 1998

[30] Foreign Application Priority Data

Jul. 4, 1997 [DE] Germany .............................. 197 28 544
Oct. 16, 1997 [DE] Germany .............................. 197 45 617

[51] Int. Cl.[7] .................................................... B60Q 1/00
[52] U.S. Cl. ...................... 340/425.5; 340/426; 340/573; 73/646; 381/86
[58] Field of Search ................................ 340/426, 425.5, 340/573; 73/646; 381/86, 103

[56] References Cited

U.S. PATENT DOCUMENTS

| | | | |
|---|---|---|---|
| 4,342,023 | 7/1982 | Tsunoda et al. ........................ | 340/460 |
| 4,641,937 | 2/1987 | Suzuki .................................... | 396/264 |
| 4,809,338 | 2/1989 | House ..................................... | 381/103 |
| 4,904,992 | 2/1990 | Grothause ........................... | 340/825.44 |
| 5,365,219 | 11/1994 | Wong et al. ......................... | 340/573.1 |
| 5,471,527 | 11/1995 | Ho et al. ................................ | 379/347 |

*Primary Examiner*—Edward Lefkowitz
*Assistant Examiner*—Davetta W. Goins
*Attorney, Agent, or Firm*—Herbert Dubno; Andrew Wilford

[57] ABSTRACT

A motor vehicle having a remotely operable subsystem provided with an acoustic emitter has a system having a microphone on the vehicle, a signal processor connected to the microphone for determining an ambient sound level at the microphone, and a controller connected between the signal-processor and the acoustic emitter for controlling an output volume of the emitter in accordance with the determined ambient sound level at the microphone.

4 Claims, 1 Drawing Sheet

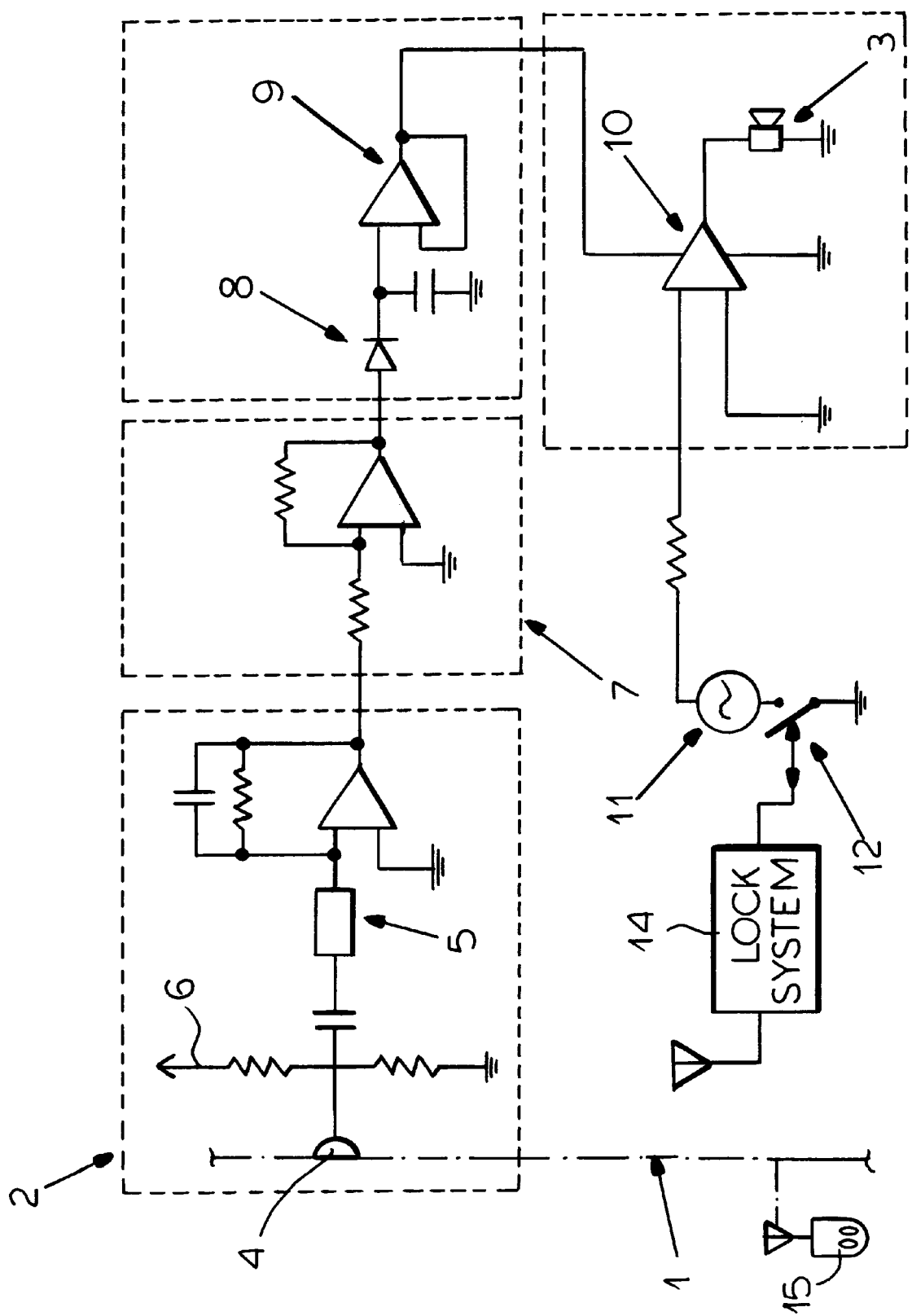

ACOUSTIC WARNING SYSTEM FOR MOTOR-VEHICLE SUBSYSTEM

FIELD OF THE INVENTION

The present invention relates to an acoustic warning system. More particularly this invention concerns such a warning system associated with a remotely controlled motor-vehicle subsystem.

BACKGROUND OF THE INVENTION

It is standard to provide a motor vehicle with a lock system or an alarm that is operated remotely. A standard lock system which for example can control the vehicle's doors, the gas-tank cover, and the trunk or hatch, can be operated by a small transmitter carried on a key ring. The transmitter can either emit separate signals for locking and unlocking or can toggle the various latches between their locked and unlocked conditions with the same signal. Similarly the transmitter can also or alternatively turn the vehicle's security system on and off.

So long as the user is relatively close to the vehicle it is a relatively simple matter to see if it is locked or not by observing if the latch buttons are up or down, or if the alarm is on by observing a pilot light that is normally set to blink when the alarm is armed. In addition it is standard to provide another signal to indicate to the user from a greater distance what the condition of the latches or alarm is or even as described in German 44 22 906 to indicate that a door has not been fully shut. For instance the vehicle's lights can blink to indicate the condition, its horn can sound, or a separate alarm or beep can be emitted that allows a user even at some distance from the vehicle to ascertain if indeed the actuation of the transmitter has had the desired effect.

In other known systems such as described in U.S. Pat. No. 5,682,135 the user can carry an interactive device that automatically unlocks the vehicle and/or disarms the alarm system when near the vehicle, and that similarly automatically locks the vehicle and/or arms the alarm system when the user gets out of range. Such arrangements are normally also associated with some sort of warning system in the vehicle to indicate to the user, who is not very close to the vehicle, that indeed the desired effect has been achieved.

The most common system, whether the remote controller works by an IF, RF, or transponder basis, is for the vehicle to be provided with a separate beeping device that emits a characteristic signal—for instance one beep or a low note—when locking the vehicle or arming the alarm and another characteristic signal—for instance multiple beeps or a high note—when unlocking the vehicle or disarming the alarm. Thus even if the user is not looking at the vehicle, he or she has confirmation that the desired effect has been achieved.

The problem with such systems is that this acoustic signal is often annoying. Late at night when it is quiet or when the vehicle is inside it is frequently found to be excessively loud while during the day on the street it is barely perceptible. Thus there is a tradeoff between a loud signal that is certain to be heard and also likely to be found annoying, and a quieter one that might not be heard but is less likely to create unwanted noise pollution.

OBJECTS OF THE INVENTION

It is therefore an object of the present invention to provide an improved acoustic warning system for a remotely operated motor-vehicle subsystem.

Another object is the provision of such an improved acoustic warning system for a remotely operated motor-vehicle subsystem which overcomes the above-given disadvantages, that is which is always heard but which does not constitute an annoyance.

SUMMARY OF THE INVENTION

A motor vehicle having a remotely operable subsystem provided with an acoustic emitter has a system having according to the invention a microphone on the vehicle, a signal processor connected to the microphone for determining an ambient sound level at the microphone, and a controller connected between the signal-processor and the acoustic emitter for controlling an output volume of the emitter in accordance with the determined ambient sound level at the microphone.

Thus with this system when the vehicle is in a noisy environment, the acoustic warning will be relatively loud so as to be perceptible over the surrounding noise, but in a quiet environment it will be a much more discreet sound.

The signal-processor according to the invention includes a filter that suppresses high-frequency sounds and the acoustic emitter emits a lower-frequency sound. The controller includes an oscillator and variable-gain amplifier having an input connected to the oscillator and an output connected to the emitter. The emitter includes an action/time controller, that is the system has a short built-in delay so that when, for instance, it receives a signal it first samples the ambient sound to determine the sound level for its acoustic response, and then makes this response. The delay is necessary to process the inputted sample and set the output level.

The emitter and the microphone can be constituted as a common element. A standard crystal or voice-coil unit can easily be adapted both to pick up and emit sound. The controller includes a microprocessor.

BRIEF DESCRIPTION OF THE DRAWING

The above and other objects, features, and advantages will become more readily apparent from the following description, reference being made to the accompanying drawing whose sole FIGURE is a schematic diagram illustrating the system of this invention.

SPECIFIC DESCRIPTION

As seen in the drawing a motor vehicle indicated schematically at 1 is provided with a subsystem, here a central lock system 14, and with a system 2 having a sound emitter 3 and a microphone 4, which may be one and the same element, e.g. a standard crystal or voice-coil unit. The output of the microphone 4 is fed to a circuit 5 that processes the signal, normally by filtering out high-frequency sounds. The circuit 5 is supplied continuous-current voltage $V_{cc}$ at an input 6 and is connected to a simple amplifier whose output in turn is fed through an amplifier 7 and a rectifier 8 to a buffer amplifier 9 that produces an analog output proportional to low-frequency ambient sounds detected by the microphone 4.

An oscillator 11 that is turned on by a switch 12 operated by the lock system 14 feeds a low-frequency signal to an input of a variable-gain amplifier 10 whose gain is controlled by the output from the buffer amplifier 9. This output is fed to the emitter 3 and its volume will therefore be proportional to the level of sound detected by the microphone 4.

When a remote transmitter 15 operates the lock system 14 the switch 12 will be closed momentarily, normally once when the lock system 14 is locked and twice when it is unlocked. The volume of the signal emitted by the speaker 3 will be proportional to ambient noise so in quiet surroundings a relatively quiet signal will be heard and in noisier surroundings the emitted acoustic signal will be correspondingly louder.

Of course all the circuit element 5, 7, 8, 9, 11, and 12 can be elements of a microprocessor. Furthermore since it is relatively easy to use the same element as the microphone 4 and emitter 3, the system of this invention can be built into an existing central-lock or alarm system at virtually no extra cost.

What is claimed is:

1. In combination with a motor vehicle having a remotely operable subsystem, a system comprising:

an acoustic emitter on the vehicle set to emit a low-frequency sound to indicate a condition of the subsystem;

a microphone on the vehicle picking up ambient sound and producing an output corresponding thereto;

signal-processing means connected to the microphone and including a low-pass filter for filtering from the output sounds of a frequency above the low frequency of the emitter, an amplifier for amplifying the filtered output, and a rectifier for transforming the amplified filtered output into an analog output having a level corresponding to a level of low-frequency sounds picked up by the microphone;

an oscillator;

a variable-gain amplifier having an input connected to the oscillator and an output connected to the emitter; and control means receiving the analog output from the rectifier and connected to the variable-gain amplifier for setting an output volume of the emitter proportional to the level of the analog output.

2. The system defined in claim 1 wherein the emitter includes an action/time control.

3. The system defined in claim 1 wherein the emitter and the microphone are constituted as a common element.

4. The system defined in claim 1 wherein the control means includes a microprocessor.

* * * * *